US005400436A

United States Patent [19]
Nara et al.

[11] Patent Number: 5,400,436
[45] Date of Patent: Mar. 21, 1995

[54] INFORMATION RETRIEVAL SYSTEM

[75] Inventors: Shigetoshi Nara; Wolfgang Banzhaf; Toshinao Ishii; Takashi Iwamoto, all of Hyogo, Japan

[73] Assignee: Mitsubishi Denki Kabushiki Kaisha, Tokyo, Japan

[21] Appl. No.: 813,159

[22] Filed: Dec. 23, 1991

[30] Foreign Application Priority Data

Dec. 26, 1990 [JP] Japan .................. 2-414094

[51] Int. Cl.⁶ .......................................... G06F 15/40
[52] U.S. Cl. ........................... 395/13; 395/22; 395/11; 395/934; 382/14
[58] Field of Search .......... 395/13, 21, 22, 600, 395/934, 11; 382/10, 14, 41

[56] References Cited

U.S. PATENT DOCUMENTS

| | | | |
|---|---|---|---|
| 4,697,242 | 9/1987 | Holland et al. | 364/513 |
| 5,040,230 | 8/1991 | Takatori et al. | 382/15 |
| 5,148,513 | 9/1992 | Koza et al. | 395/13 |

OTHER PUBLICATIONS

Psaltis et al., "Optoelectronic Implementations of Neural Networks," IEEE Communications Magazine, Nov. 1989, 37-40.

Lippmann, R. P., "Pattern Classification Using Neural Networks," IEEE Communications Magazine, Nov. 1989, 47-64 (less pp. 51-58).

Treleaven et al., "VLSI Architectures for Neural Networks," IEEE Micro, Dec. 1989, 8-27.

Chang et al., "Using Genetic Algorithms to Select and Create Features for Pattern Classification," Intl. Joint Conf. on Neural Networks, Jun. 1990, III-747 to III--752.

Singh, J., "Use of True-Complement Optical Images for Efficient Associative Memory Implementation," IJCNN 90, Jun. 1990, I-839 to I-846.

Adachi et al., "Feature Selection for Neural Network Recognition," 1991 IEEE Intl. Joint Conf. on Neural Networks, Nov. 1991, 696-701.

Lippmann, R. P., "An Introduction to Computing with Neural Nets", IEEE ASSP Magazine, Apr. 1987, 4-22.

Char et al., "Distributed and Fault-Tolerant Computation for Retrieval Tasks Using Distributed Associative Memories," IEEE Trans. on Computers, Apr. 1988, 484-490.

Gordon, M., "Probabilistic and Genetic Algorithms for Document Retrieval," Communications of the ACM, Oct. 1988, 1208-1218.

Goldberg, D. E, Genetic Algorithms in Search, Optimization, and Machine Learning, Addison-Wesley Pub. Co., Inc., 1989, 10-14, 95-97, 101, 102, 166-175, 208-212.

G. E. Goldberg, "A Gentle Introduction to Genetic Algorithms", (1989): Genetic Algorithms, (Addison Wesley), pp. 1-23.

Primary Examiner—Robert W. Downs
Attorney, Agent, or Firm—Wolf, Greenfield & Sacks

[57] ABSTRACT

An information retrieval system retrieves stored information on the basis of incomplete or noisy retrieval key information within a realistic processing time. The information to be recalled is stored in neural network associative memory. Genetic algorithms are adopted to avoid a thorough retrieval of data in a huge breadth and depth of high-order space which must otherwise be searched due to ambiguity of retrieval key information. The information containing the given retrieval key is effectively sought. A processor employs a neural network. A memory is correctly recalled from partial inputs or inputs in which noise is extremely pronounced by repeating a sum-of-product operation of a firing pattern within a synapse coupling matrix and also threshold value processing.

14 Claims, 10 Drawing Sheets

INFORMATION RETRIEVAL SYSTEM

BACKGROUND OF THE INVENTION

1. Field of the Invention

The present invention is directed generally to an information retrieval system, and more particularly, to an information retrieval system to which neural network techniques and genetic algorithms are applied.

2. Description of the Prior Arts

Figure 8:
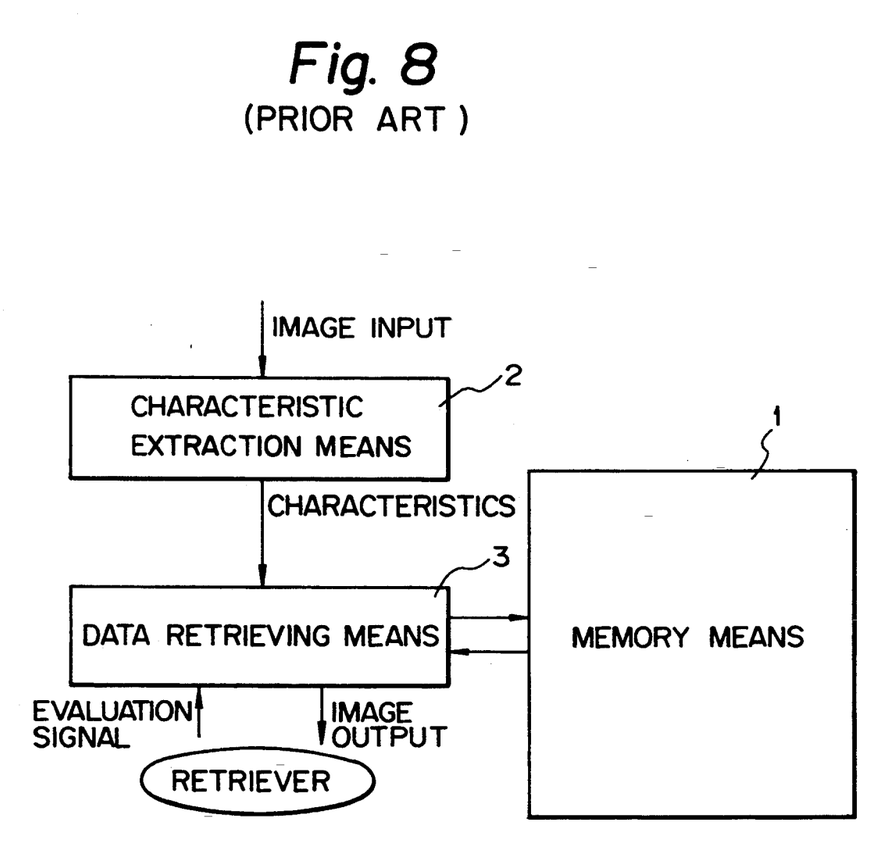
FIG. 8 is a block diagram depicting a conventional information retrieval system.

A variety of information retrieval techniques have hitherto been utilized. Recently, however, in a set of image-oriented data such as an image databases and voice databases, there has been an increasing necessity for executing a retrieval under ambiguous conditions with partial characteristics of the accumulated data serving as a key. A system for executing this kind of retrieval has been conventionally actualized in a so-called von Neumann computer in terms of software. FIG. 8 is a block diagram illustrating, e.g., a conventional information retrieval system. The information retrieval system depicted in this Figure is intended to retrieve an original image with the (partial) characteristics of the image inputted by the retriever from the image database in which the images are classified according to the characteristics. Designated at 1 in the same Figure is a memory for storing a database obtained by classifying images according to a variety of characteristics. The numeral 2 represents a characteristic extractor for extracting characteristics from image inputs inputted for retrieving data from the database thereof; and 3 a data retriever for obtaining a desired image data output by searching the memory 1 on the basis of the characteristics extracted by the characteristic extractor 2.

Next, the operation of the prior art information retrieval system will be explained. Assumed is a case where the retriever does not have sufficient information on the object to be retrieved—this could be a case where the retriever carries out the retrieval to specify a person who cannot be clearly remembered and on whom the only information consists of facial characteristics from photographs stored in the memory after a single prior meeting.

Figure 9:
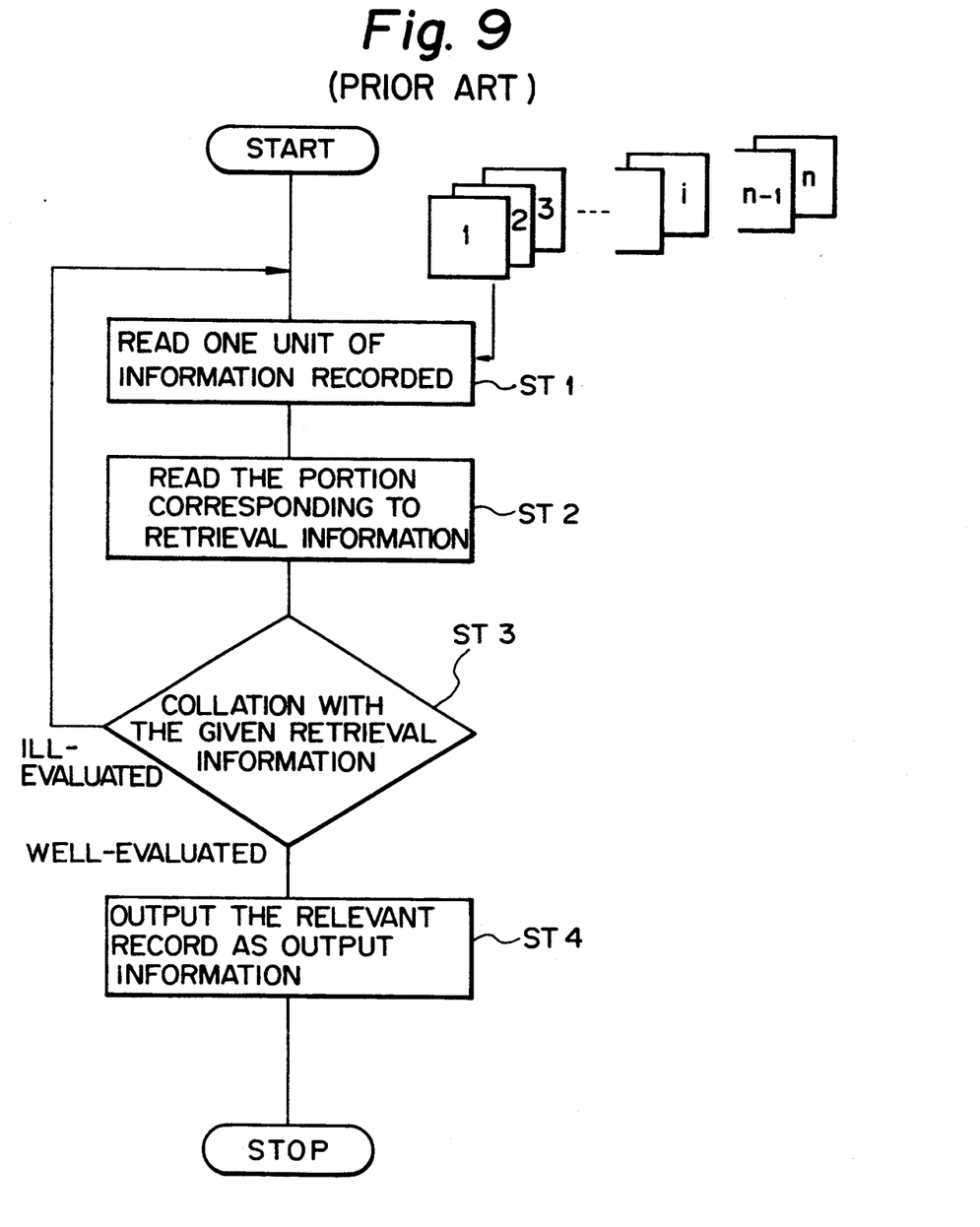
FIG. 9 is a flowchart showing procedures of the process of the system of FIG. 8.

FIG. 9 is a flowchart illustrating procedures. When the retrieval information (e.g., portraits) for a judgment is inputted by the retriever, the characteristics thereof are extracted by the characteristic extractor 2 and sent to a data retrieval system 3. The data retrieval system 3 reads one unit-i.e., a sheet of facial photo-of information stored as database in the memory (step ST1).

Next, the data retrieval system 3 performs a scanline decomposition or pixel decomposition of the read facial photo. Based on this, the characteristic portions corresponding to the above-mentioned retrieval information are extracted (step ST2). These portions are collated with the characteristics extracted from the retrieval information by the characteristic retriever 2 (step ST3). As a result, if an evaluation of collation is acceptable, the facial photo is displayed on an unillustrated display (step ST4), and the operation is then finished. Whereas if not acceptable, the operation is returned to step ST1. The next facial photo is read, the same operation is repeated till a desired facial photo is detected.

The conventional information retrieval system is constructed as outlined above and has critical defects as follows. Assuming that there is an image database accumulating facial photographs as data to be retrieved in the memory 1, the facial photo data is expressed by, e.g., N-pieces of pixels each having a degree of freedom of 1 bit. Further assuming that an input information as a key for retrieving image data from the database cannot be described sufficiently, namely, can only be described somewhat ambiguously, expressing partial facial characteristics, the number of partial characteristics of a face will be in the order of an exponential function of the pixel number "N". Accordingly, storing all such characteristics with addresses in the memory 1 with the characteristics serving as a key and with all the stored characteristics being sequentially compared with each other, an "explosion of number of cases" is inevitable. Further, if the partial facial characteristics containing an ambiguity must be specified, e.g., "a square-faced outline" by a program based on von Neumann type processing, there exists a problem that "an extreme intricacy of program" is required.

It is an object of the present invention, which has been devised to obviate the problems described above, to provide an information retrieval system capable of obtaining a result of retrieval on the basis of key retrieval information containing an ambiguity within a range of realistic processing time, wherein a program has a substantially realistic degree of intricacy.

SUMMARY OF THE INVENTION

An information retrieval system according to the present invention comprises: fetching system for fetching one or a plurality of individuals (single unit data is referred to as an individual which will hereinafter be mentioned) from an aggregation of individuals prepared in a memory; genetic operation system for effecting genetic operations (which will be mentioned later) on the fetched individual; processor for extracting a memory information recalled by recursively effecting a state updating operation with respect to a firing pattern configured by the genetic operations till the firing pattern converges in a steady-state; and evaluator for giving an evaluation by collating the memory recalled information obtained by the processor with the retrieval key information replacing if well evaluated, the individual with the relevant one in the memory and rejecting, if unsatisfactorily evaluated, this individual.

In the information retrieval system according to the present invention, the genetic algorithms are adopted for operations by the genetic operation system to avoid a thorough retrieval of data in a huge breadth and depth of high-order space which must otherwise be searched due to the ambiguity of the retrieval key information. The information containing the given retrieval key information is therefore effectively sought. Simultaneously, a neural network is adopted as the processor. Repeated are the sum-of-product operation of the firing pattern with the synapse coupling matrix and also the threshold value processing. They are correctly recalled from the memory by the partial inputs or the inputs in which the noises are extremely large. The "explosion of numbers of cases" can thus be avoided, and "extreme intricacy of program" is also avoided.

With respect to the GENETIC ALGORITHM or GENETIC OPERATION, reference should be made to the publication "GENETIC ALGORITHMS" by D. E. Goldberg, 1989, published by Addison Wesley. In pages 1–23 of the above referenced publication, a definition of the GENETIC ALGORITHMS, general explanation of optimization, difference between the GE- NETIC ALGORITHMS and traditional one, a simple example of the GENETIC ALGORITHM and some applications thereof are explained.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENT

Figure 1:
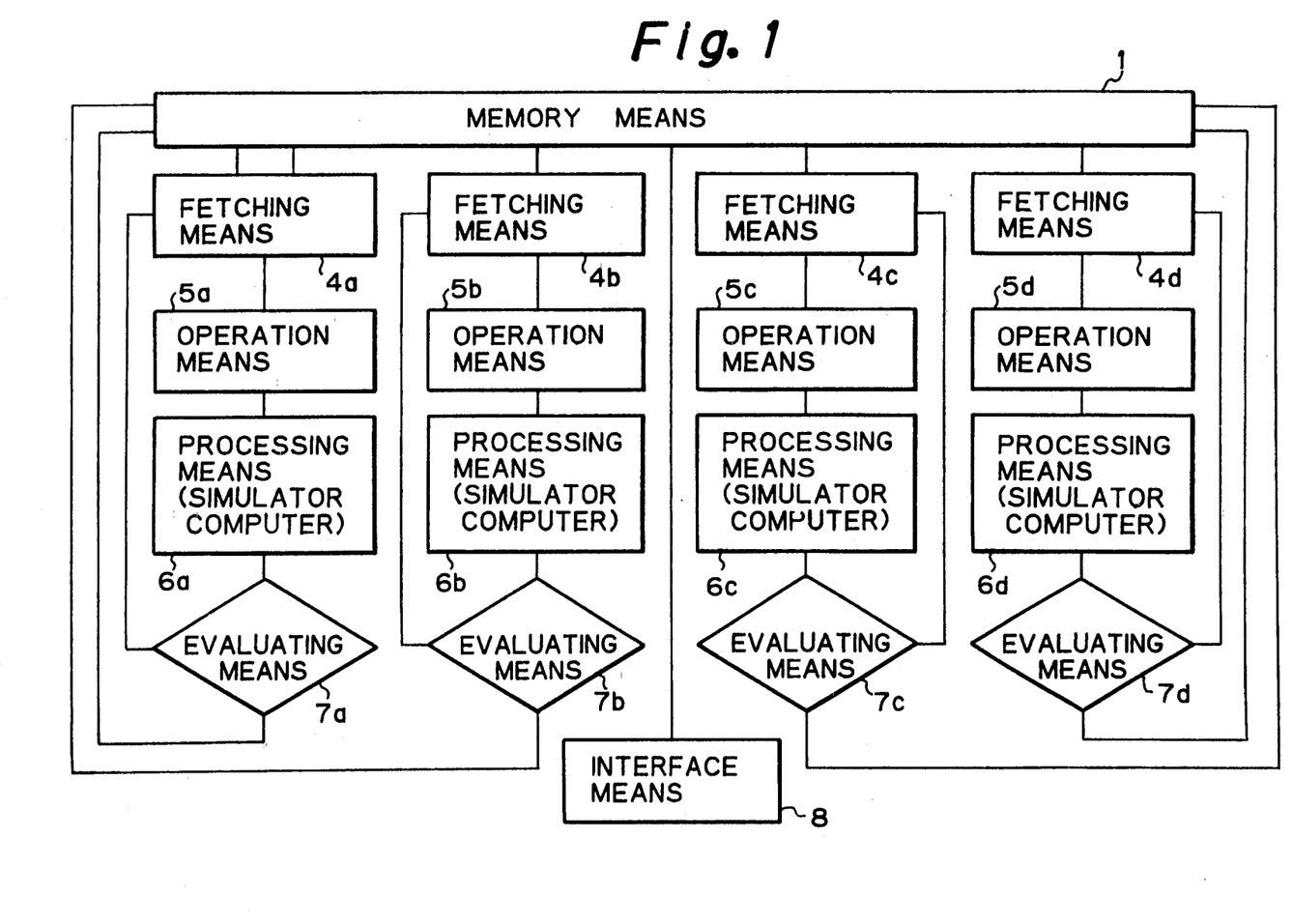
FIG. 1 is a block diagram illustrating an information retrieval system in one embodiment of the present invention.

One embodiment of the present invention will hereinafter be described with reference to the drawings. Designated at 1 in FIG. 1 is a memory equivalent to the conventional memory depicted in FIG. 8. The memory 1 accumulates an aggregation of individuals having two portions, i.e., a firing pattern generated during a process of retrieval and an evaluation part for evaluating a degree of coincidence with a target memory to be retrieved.

Indicated at 4a–4d are fetching system, each incorporating a random number generator, for fetching one or a plurality of individuals at random from the aggregation of the individuals prepared in the memory 1. In the illustrative example, the fetching system 4a fetches two individuals, while the fetching system 4b–4d each fetch one individual.

The symbols 5a–5d represent genetic operation system for effecting genetic operations with respect to the individuals fetched by the respective fetching system 4a–4d. In this embodiment, the genetic operation system 5a effects a crossover operation to prepare a new firing pattern by the crossover operation from the two individuals fetched by the fetching system 4a. The genetic operation system 5b incorporating the random number generator performs a mutational operation to replace a part of the firing pattern for the individual fetched by the fetching system 4b with a random pattern given from the random number generator. The genetic operation system 5c effects a complement operation to invert a part of the firing pattern for the individual fetched by the fetching system 4c, The genetic operation system 5d carries out a reverse operation to partly reverse a row of the firing pattern for the individual fetched by the fetching system 4d.

Designated at 6a–6d are simulator computers composed of neural networks and serving as processor for recursively performing a state updating operation on the firing pattern configured by the genetic operation of the respective genetic operation system 5a–5d till this firing pattern converges in a steady-state and extracting a memory information recalled. The symbols 7a–7d denote evaluator for giving evaluations by collating the recalled memory information extracted by the processor means 6a–6d with the retrieval key information. The means evaluators 7a–7d return, if the evaluations are better than the contents in the evaluation part of the individuals fetched by the fetching system 4a–4d, them to the memory 1 in place of the fetched individuals and if unsatisfactory, rejecting them. The numeral 8 represents an interface with the retriever.

Next, operation of this embodiment will be explained. In this instance also, explanation is made of a case where a variety of facial photos are retrieved based on ambiguous retrieval key information in the same way as in the prior art.

This subject is defined as a so-called deteriorated setting problem. The following is a description of how a setting is effected.

(a) The memory contains an extremely large amount of information in the form of distributed expressions.

(b) The retriever is incapable of giving complete information on the object to be retrieved but is capable providing partial "characteristics" for use in the retrieval.

(c) The partial information imparted for the retrieval is not established and can be given with a certain allowable range.

(d) The retriever is capable of giving a judgment based on how satisfactory the output of the retrieval system is considered to be.

Where the retrieval example, as will be further explained later, is put into another expression while being collated with the foregoing deteriorated setting problem, it follows that the retrieval is an operation to specify a face from a collection of facial photos accumulated in the memory, under such circumstances that the retriever is only capable of describing partial characteristics of the face.

Figure 2A:
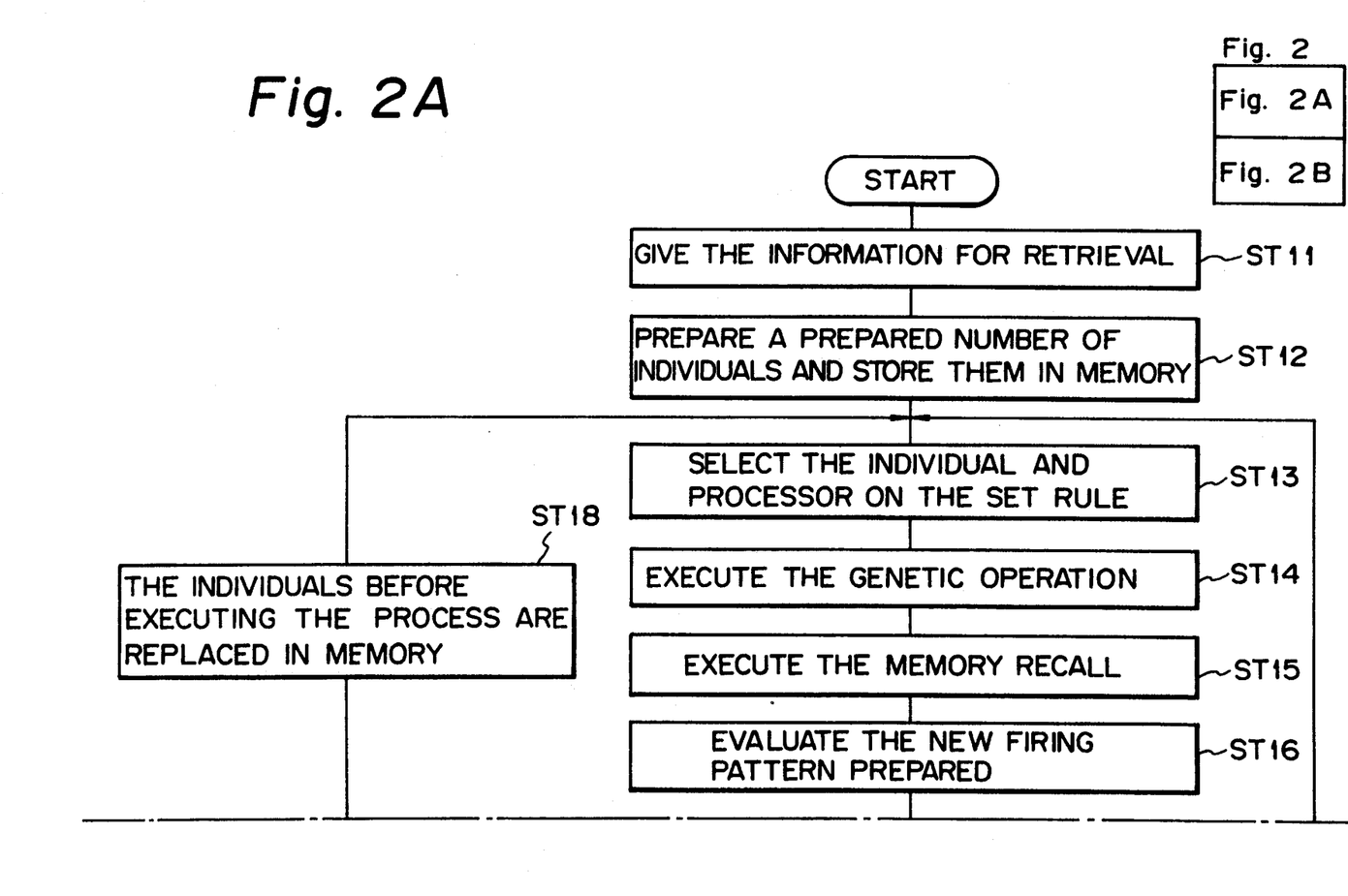
FIGS. 2A and 2B form a flowchart showing procedures of the process of the system of FIG. 1.
Figure 2B:
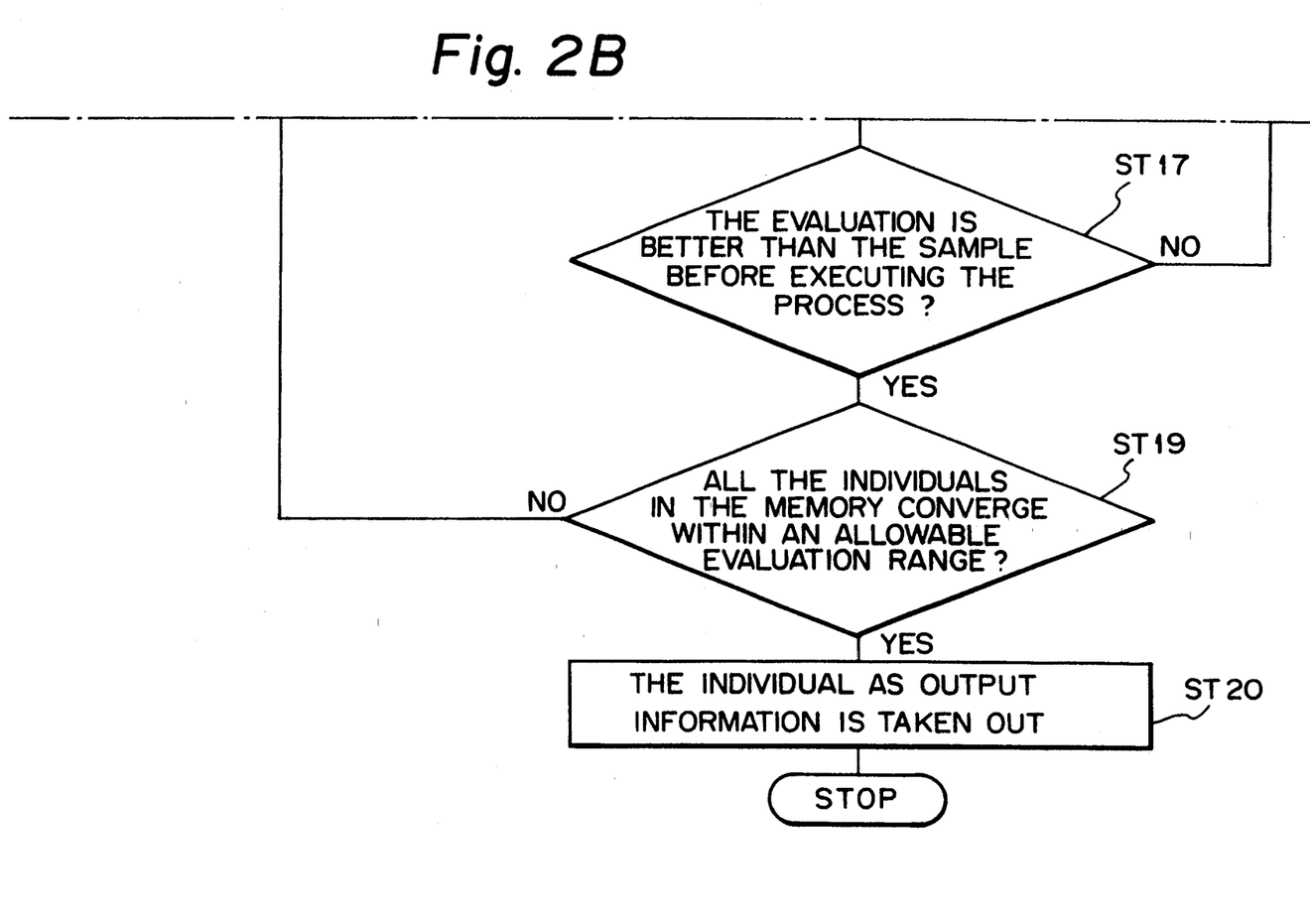

FIG. 2 is a flowchart showing the processing procedures. The process starts with imparting tile key information for the retrieval. To be specific, the partial facial characteristics are given as an inter-pixel correlation function, and a tolerance on the occasion of that retrieval is also given (step ST11). Next, an arbitrary initial image is taken up and pixel-decomposed or scan-line-decomposed. The correlation function as partial characteristics is computed. A value of the evaluation thereof is paired with a pixel group of the firing pattern given, thus obtaining one individual. A predetermined number of independent individuals are prepared and stored respectively in the memory means 1 (step ST12).

Next, the fetching system 4a–4d selectively fetch some individuals from the memory 1 on the basis of the rule prescribed. The fetched individuals are imparted in parallel separately to the respective genetic operation system 5a–5d (step ST13). The genetic operation system 5a–5d execute the respective genetic operations (step ST14). In accordance with this embodiment, the respective genetic operations herein consist of four kinds of operations, i.e., a crossover operation between the predetermined pixel groups for two individuals (1), a mutational operation in the predetermined number of pixels for one individual (2), a complement operation in the predetermined number of pixels of one individual (3) and a reverse operation in the predetermined number of pixels for one individual (4).

As a result, a firing pattern based on a new pixel group is obtained from each of the genetic operation system 5a–5d. These patterns are sent to the simulator computers 6a–6d corresponding thereto. The process of memory recall based on each neural network is executed (step ST15). The procedures imply a state updating operation of the firing pattern based on a sum-of-product operation with respect to a synapse coupling matrix of the neural network and threshold value processing effected thereafter. The procedures are recursively performed till the firing pattern converges in the steady-state.

The firing patterns conceived as the thus obtained recall results are collated with the retrieval key information and evaluated in the respective evaluator 7a–7d (step ST16). The result values of the evaluation are compared with values of the evaluation parts of the firing patterns before effecting the respective processes (step ST17). In consequence of this, satisfactorily evaluated individuals are replaced with the original individuals before execution of the process concerned in the memory 1 (step ST18), whereas unsatisfactorily evaluated individuals are rejected. Bach fetching process is performed based on the predetermined rule. A series of processes as one set are effected once in turn. Some of these procedures are repeated, whereby the number of satisfactorily evaluated individuals increases in the memory. When extracting the fact that all the individuals in the memory are brought into a given evaluation allowable range (step ST19), those individuals are outputted as output information (step S20), and the process is stopped.

Figure 3:
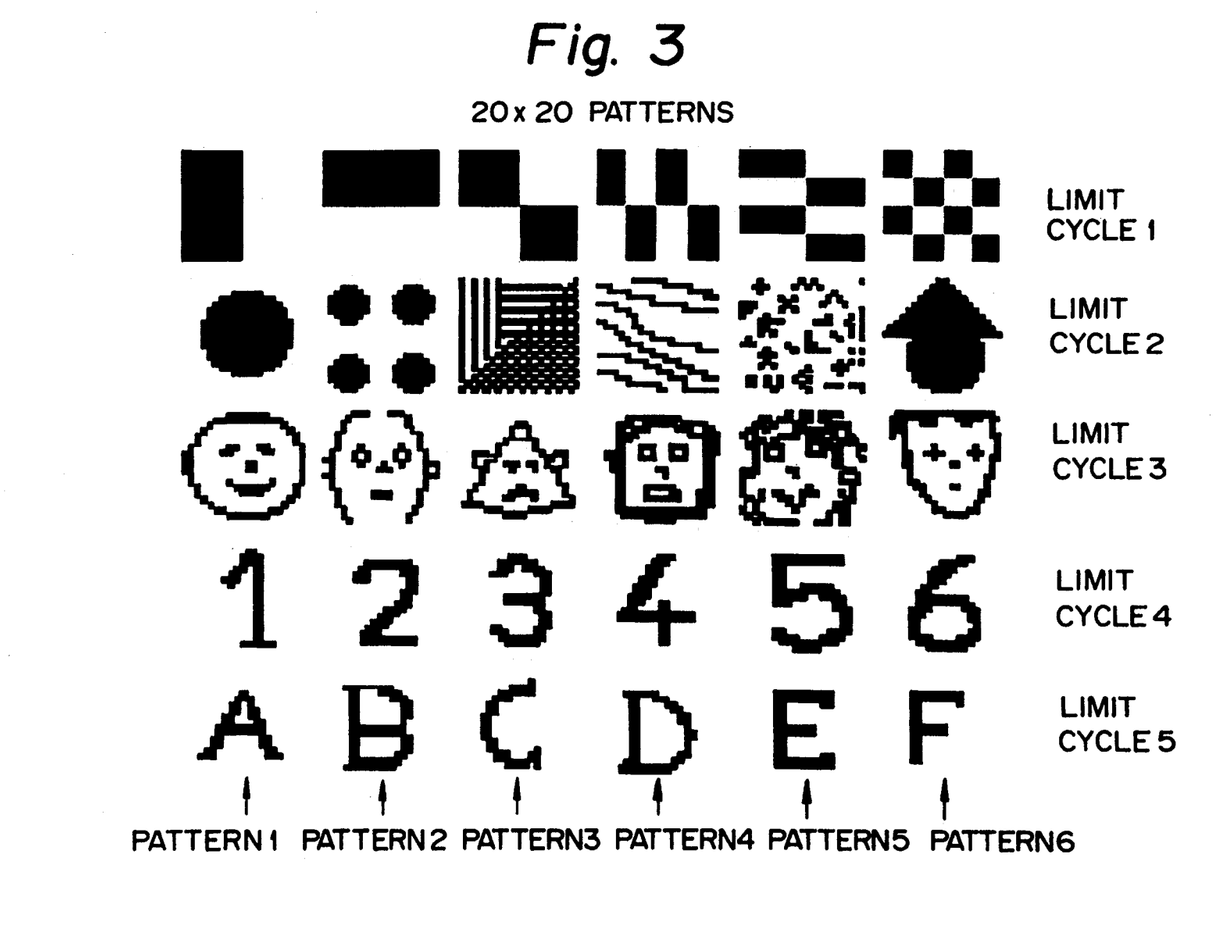
FIG. 3 is an explanatory diagram showing one example of firing patterns stored in a neural network of the system of FIG. 1.
Figure 4:
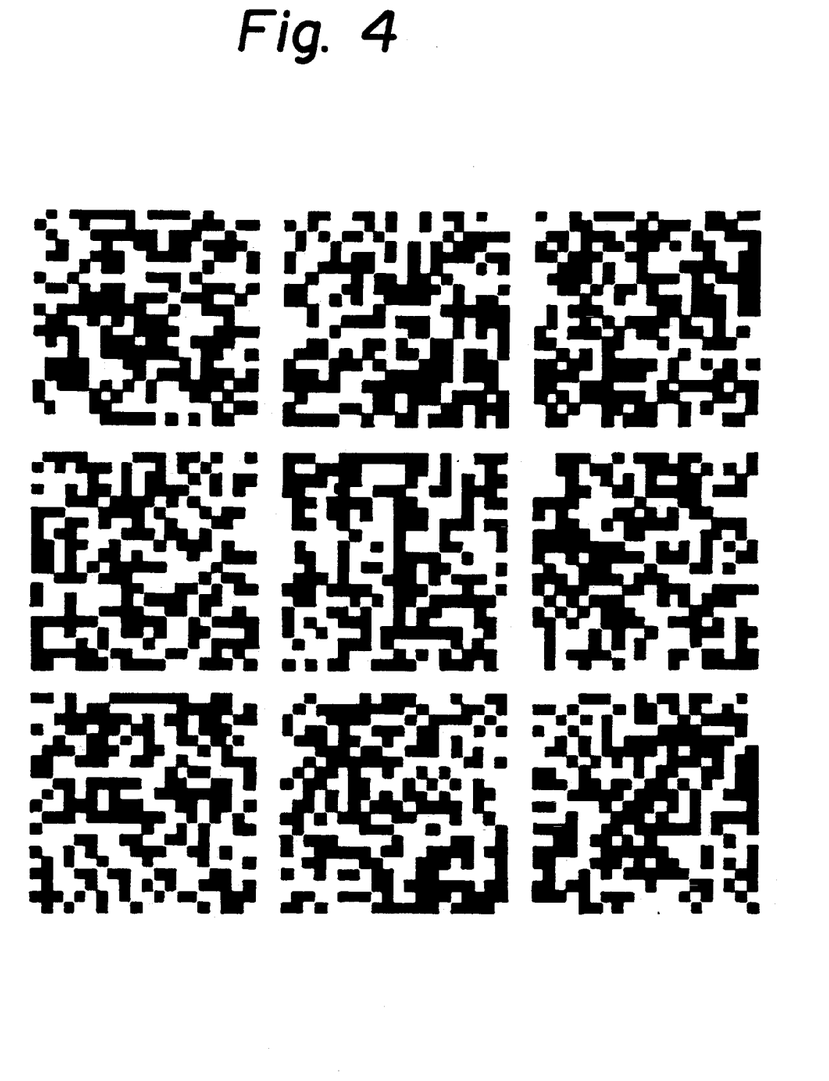
FIGS. 4 through 7 are explanatory diagrams each showing a situation where a target pattern of the system of FIG. 1 converges.
Figure 5:
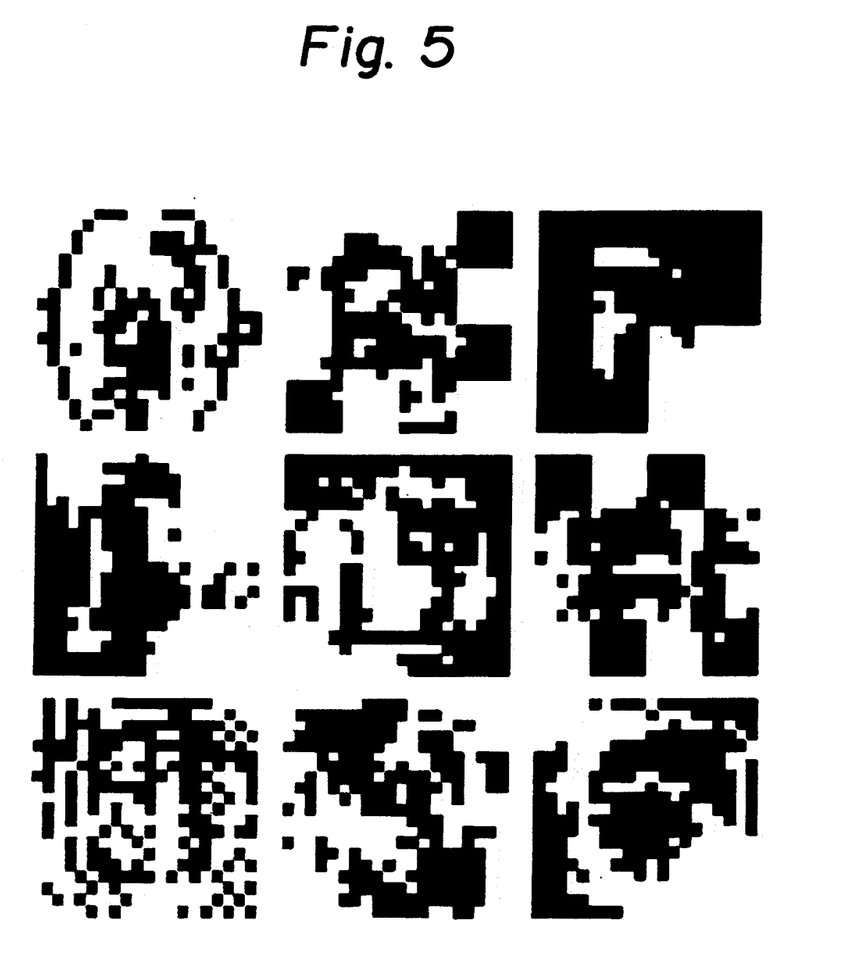
Figure 6:
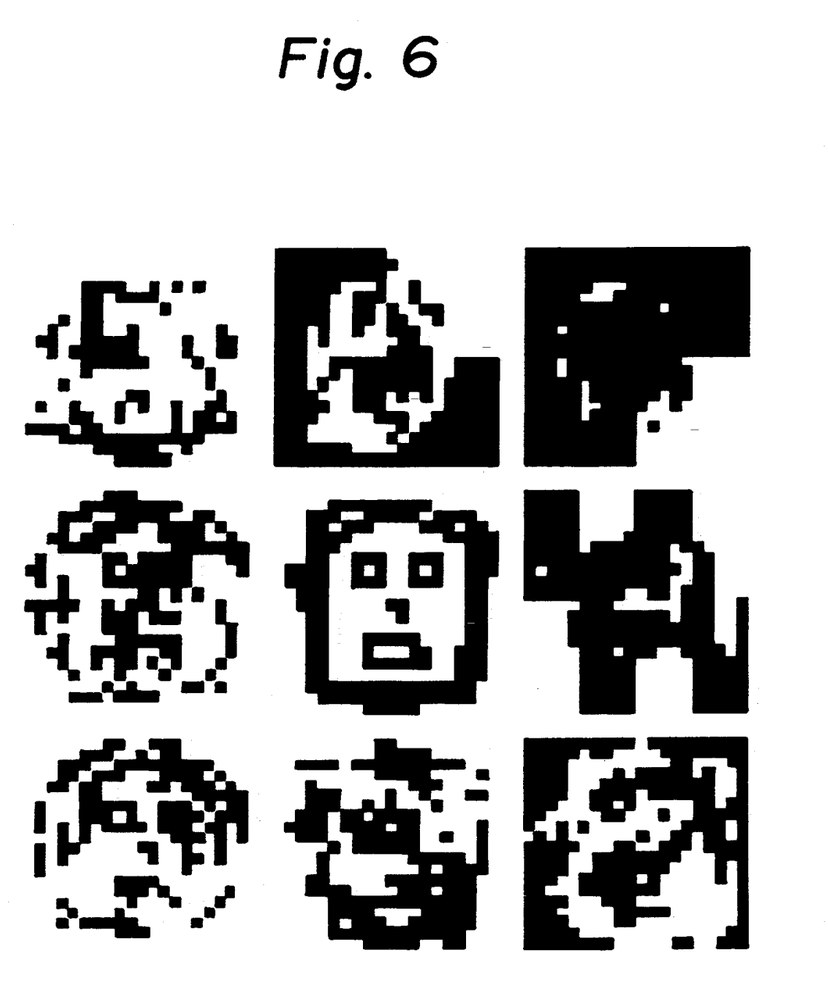
Figure 7:
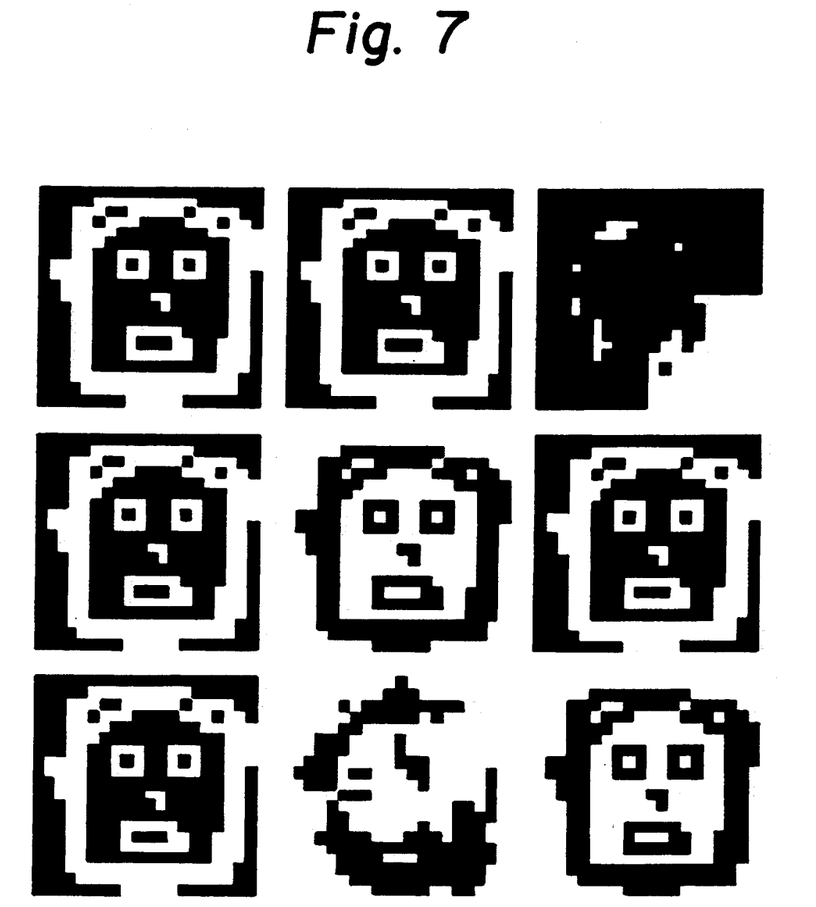

FIG. 3 depicts 30 types of image firing patterns stored in the neural network for use with a test in this embodiment. One firing pattern consists of (20×20=400) pieces of pixels. FIGS. 4–7 illustrate the firing patterns at respective timings when the retrieval is executed with the 16th pattern (LIMIT CYCLE 3, PATTERN 4) serving as a target pattern. Namely, FIG. 4 illustrates the firing pattern defined as an initial condition belonging to each of nine individuals picked up at random in this embodiment. FIG. 5 depicts the firing patterns for each individual in the 42nd turn. FIG. 7 depicts the firing pattern in the 142nd turn. As obvious from FIGS. 4–7, it is possible to grasp a situation where the individual in the memory 1 gradually converges to the target pattern, thus bringing about a successful retrieval.

Note that the embodiment given above has dealt with the case where the genetic operation includes four kinds of operations, i.e., the crossover operation, the mutational operation, the complement operation and the reverse operation and are processes in parallel. Additional operations are a shift operation to sequentially shift suffixes of the patterns and a built-in operation of rows in which, for instance, the values are all "1". A variety of other operations are available. Further, the operations become different on the whole depending on the frequency at which the respective operations described above are executed. A problem of specifying the effective operation to be performed differs in many ways depending on how the information is incorporated into the patterns to be dealt with. Hence, a new operation matching therewith can be considered, and the above-mentioned operations can also be improved. Those operations may be executed not only in parallel but also one by one in accordance with a certain sequence.

Besides, the genetic operation system and the processor may involve the use of not only ready-made general purpose computers for processing but also entirely dedicated electronic integrated circuits (VLSI) or dedicated light integrated circuits for processing. The whole system may be constructed as a combination of those devices for effecting the process.

Although the illustrative embodiment of the present invention has been described in detail with reference to the accompanying drawings, it is to be understood that the present invention is not limited to that embodiment. Various changes or modifications may be effected therein by one skilled in the art without departing from the scope or spirit of the invention.

What is claimed is:

1. An information retrieval system comprising:

a memory means for storing a set of individual data in which a firing pattern indicating a characteristic of information to be retrieved is combined with a value indicating a degree of coincidence of said firing pattern with data inputted as retrieval key information;

fetching means for fetching one or more individual pieces of data from said memory means;

operation means, connected to said fetching means, for effecting a genetic operation with respect to said fetched individual piece of data;

processing means, composed of a neural network including a synapse coupling matrix generated by taking a correlation from an aggregation of said firing patterns to be embedded in the form of memory, for extracting recall information by receiving said firing pattern as a result of being operated by said operating means, executing a state updating operation of performing a sum-of-product operation and a threshold value process of said firing pattern with said synapse coupling matrix and recursively executing said state updating operation till said firing pattern converges in a steady-state; and evaluation means for giving an evaluation by collating said recall information extracted by said processing means with the retrieval key information, replacing, if a value of said evaluation is higher than an evaluation value of said fetched individual data, said individual data within said memory means with said recall information and rejecting, if lower than said evaluation value, said recall information;

wherein the genetic operation includes a crossover operation, mutational operation, a complementing operation and a reverse operation which are executed in parallel.

2. The system of claim 1 wherein the correlation is an auto-correlation.

3. The system of claim 2 wherein the correlation also includes a cross-correlation.

4. The system of claim 1 wherein the correlation is a cross-correlation.

5. An information retrieval system comprising:

a memory means for storing a set of individual data in which a firing pattern indicating a characteristic of information to be retrieved is combined with a value indicating a degree of coincidence of said firing pattern with data inputted as retrieval key information;

fetching means for fetching one or more individual pieces of data from said memory means;

operation means, connected to said fetching means, for effecting a genetic operation with respect to said fetched individual piece of data;

processing means, composed of a neural network including a synapse coupling matrix generated by taking a correlation from an aggregation of said firing patterns to be embedded in the form of memory, for extracting recall information by receiving said firing pattern as a result of being operated by said operating means, executing a state updating operation of performing a sum-of-product operation and a threshold value process of said firing pattern with said synapse coupling matrix and recursively executing said state updating operation till said firing pattern converges in a steady-state; and evaluation means for giving an evaluation by collating said recall information extracted by said processing means with the retrieval key information, replacing, if a value of said evaluation is higher than an evaluation value of said fetched individual data, said individual data within said memory means with said recall information and rejecting, if lower than said evaluation value, said recall information;

wherein said genetic operation includes a crossover operation, a mutational operation, a complementing operation and a reverse operation which are sequentially executed.

6. An information retrieval system comprising:

a memory means for storing a set of individual data in which a firing pattern indicating a characteristic of information to be retrieved is combined with a value indicating a degree of coincidence of said firing pattern with data inputted as retrieval key information;

fetching means for fetching one or more individual pieces of data from said memory means;

operation means, connected to said fetching means, for effecting a genetic operation with respect to said fetched individual piece of data;

processing means, composed of a neural network including a synapse coupling matrix generated by taking a correlation from an aggregation of said firing patterns to be embedded in the form of memory, for extracting recall information by receiving said firing pattern as a result of being operated by said operating means, executing a state updating operation of performing a sum-of-product operation and a threshold value process of said firing pattern with said synapse coupling matrix and recursively executing said state updating operation till said firing pattern converges in a steady-state; and evaluation means for giving an evaluation by collating said recall information extracted by said processing means with the retrieval key information, replacing, if a value of said evaluation is higher than an evaluation value of said fetched individual data, said individual data within said memory means with said recall information and rejecting, if lower than said evaluation value, said recall information;

wherein said genetic operation includes a shift operation of sequentially shifting suffixes of said firing patterns.

7. An information retrieval system comprising:

a memory means for storing a set of individual data in which a firing pattern indicating a characteristic of information to be retrieved is combined with a value indicating a degree of coincidence of said firing pattern with data inputted as retrieval key information;

fetching means for fetching one or more individual pieces of data from said memory means;

operation means, connected to said fetching means, for effecting a genetic operation with respect to said fetched individual piece of data;

processing means, composed of a neural network including a synapse coupling matrix generated by taking a correlation from an aggregation of said firing patterns to be embedded in the form of memory, for extracting recall information by receiving said firing pattern as a result of being operated by said operating means, executing a state updating operation of performing a sum-of-product operation and a threshold value process of said firing pattern with said synapse coupling matrix and recursively executing said state updating operation till said firing pattern converges in a steady-state; and evaluation means for giving an evaluation by collating said recall information extracted by said processing means with the retrieval key information, replacing, if a value of said evaluation is higher than an evaluation value of said fetched individual data, said individual data within said memory means with said recall information and rejecting, if lower than said evaluation value, said recall information;

wherein the genetic operation includes an operation of incorporating rows in which values are all a single value.

8. An information retrieval method comprising:

(A) the steps of generating a set of individual data in which a firing pattern indicating a characteristic of information to be retrieved is combined with a value indicating a degree of coincidence of said firing pattern with a data inputted as a retrieval key information;

(B) fetching one or more pieces of individual data from said individual data set;

(C) effecting a genetic operation with respect to said fetched individual data;

(D) generating a synapse coupling matrix generated by taking a correlation from an aggregation of said firing patterns to be embedded in the form of memory;

(E) receiving said firing pattern as a result of undergoing said genetic operation and executing a state updating operation of effecting a sum-of-product operation and a threshold value process of said firing pattern with said synapse coupling matrix;

(F) extracting recall information by recursively executing said step (E) till said firing pattern converges in a steady-state;

(G) providing an evaluation by collating said extracted recall information with key retrieval information, replacing, if a value of said evaluation is higher than an evaluation value of said fetched individual data, said individual data within said memory means with said recall information and rejecting, if lower than said evaluation value, said recall information; and (H) repeating said steps (B) through (G) till said evaluated values of all said individual data fall within an allowable range;

wherein said genetic operation includes a crossover operation, a mutational operation, a complementing operation and a reverse operation are executed in parallel.

9. The system of claims 8 wherein the correlation is an auto-correlation.

10. The system of claim 9 wherein the correlation also includes a cross-correlation.

11. The system of claim 8 wherein the correlation is a cross-correlation.

12. An information retrieval method comprising:
(A) the steps of generating a set of individual data in which a firing pattern indicating a characteristic of information to be retrieved is combined with a value indicating a degree of coincidence of said firing pattern with a data inputted as a retrieval key information;
(B) fetching one or more pieces of individual data from said individual data set;
(C) effecting a genetic operation with respect to said fetched individual data;
(D) generating a synapse coupling matrix generated by taking a correlation from an aggregation of said firing patterns to be embedded in the form of memory;
(E) receiving said firing pattern as a result of undergoing said genetic operation and executing a state updating operation of effecting a sum-of-product operation and a threshold value process of said firing pattern with said synapse coupling matrix;
(F) extracting recall information by recursively executing said step (E) till said firing pattern converges in a steady-state;
(G) providing an evaluation by collating said extracted recall information with key retrieval information, replacing, if a value of said evaluation is higher than an evaluation value of said fetched individual data, said individual data within said memory means with said recall information and rejecting, if lower than said evaluation value, said recall information; and
(H) repeating said steps (B) through (G) till said evaluated values of all said individual data fall within an allowable range;
wherein said genetic operation includes a crossover operation, a mutational operation, a complementing operation and a reverse operation which are sequentially executed.

13. An information retrieval method comprising:
(A) the steps of generating a set of individual data in which a firing pattern indicating a characteristic of information to be retrieved is combined with a value indicating a degree of coincidence of said firing pattern with a data inputted as a retrieval key information;
(B) fetching one or more pieces of individual data from said individual data set;
(C) effecting a genetic operation with respect to said fetched individual data;
(D) generating a synapse coupling matrix generated by taking a correlation from an aggregation of said firing patterns to be embedded in the form of memory;
(E) receiving said firing pattern as a result of undergoing said genetic operation and executing a state updating operation of effecting a sum-of-product operation and a threshold value process of said firing pattern with said synapse coupling matrix;
(F) extracting recall information by recursively executing said step (E) till said firing pattern converges in a steady-state;
(G) providing an evaluation by collating said extracted recall information with key retrieval information, replacing, if a value of said evaluation is higher than an evaluation value of said fetched individual data, said individual data within said memory means with said recall information and rejecting, if lower than said evaluation value, said recall information; and
(H) repeating said steps (B) through (G) till said evaluated values of all said individual data fall within an allowable range;
wherein said genetic operation includes a shift operation of sequentially shifting suffixes of said firing patterns.

14. An information retrieval method comprising:
(A) the steps of generating a set of individual data in which a firing pattern indicating a characteristic of information to be retrieved is combined with a value indicating a degree of coincidence of said firing pattern with a data inputted as a retrieval key information;
(B) fetching one or more pieces of individual data from said individual data set;
(C) effecting a genetic operation with respect to said fetched individual data;
(D) generating a syanapse coupling matrix generated by taking a correlation from an aggregation of said firing patterns to be embedded in the form of memory;
(E) receiving said firing pattern as a result of undergoing said genetic operation and executing a state updating operation of effecting a sum-of-product operation and a threshold value process of said firing pattern with said synapse coupling matrix;
(F) extracting recall information by recursively executing said step (E) till said firing pattern converges in a steady-state;
(G) providing an evaluation by collating said extracted recall information with key retrieval information, replacing, if a value of said evaluation is higher than an evaluation value of said fetched individual data, said individual data within said memory means with said recall information and rejecting, if lower than said evaluation value, said recall information; and
(H) repeating said steps (B) through (G) till said evaluated values of all said individual data fall within an allowable range;
wherein said genetic operation includes an operation of incorporating rows in which values are all a single value.

* * * * *